US007017179B1

(12) United States Patent
Asamoto et al.

(10) Patent No.: US 7,017,179 B1
(45) Date of Patent: Mar. 21, 2006

(54) DATA RECEIVING APPARATUS AND METHOD

(75) Inventors: Noriaki Asamoto, Kusatsu (JP); Shinsuke Mitsuma, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/430,733

(22) Filed: Oct. 29, 1999

(30) Foreign Application Priority Data

Oct. 29, 1998 (JP) ................................. 10-307946

(51) Int. Cl.
*H04N 7/16* (2006.01)

(52) U.S. Cl. ...................... 725/152; 725/93; 725/145; 725/146; 386/83

(58) Field of Classification Search ................ 725/46, 725/55, 85, 139, 141, 48, 68, 58; 386/46, 386/83, 95
See application file for complete search history.

(56) References Cited

U.S. PATENT DOCUMENTS

| | | | | |
|---|---|---|---|---|
| 5,532,754 | A | * | 7/1996 | Young et al. |
| 5,758,257 | A | * | 5/1998 | Herz et al. |
| 5,768,539 | A | * | 6/1998 | Metz et al. |
| 6,091,456 | A | * | 7/2000 | Schaas ........................ 348/460 |
| 6,167,186 | A | * | 12/2000 | Kawasaki et al. ............. 386/46 |
| 6,185,360 | B1 | * | 2/2001 | Inoue et al. .................... 386/46 |
| 6,240,240 | B1 | * | 5/2001 | Nagano et al. ................ 386/83 |
| 6,344,878 | B1 | * | 2/2002 | Emura ......................... 348/460 |

FOREIGN PATENT DOCUMENTS

| | | |
|---|---|---|
| JP | 6120254 | 9/1986 |
| JP | 0330530 | 2/1991 |
| JP | 0419919 | 1/1992 |
| JP | 7288497 | 10/1995 |
| JP | 9307495 | 11/1997 |

OTHER PUBLICATIONS

"Full Picture of Next Generation Digital Television" special edition, Nikkei Media, Nikkei Business Publications, Inc., 1997, ISBN4-8222-0882-6, p. 33-38.

* cited by examiner

*Primary Examiner*—Kieu-Oanh Bui
(74) *Attorney, Agent, or Firm*—Duke W. Yee; Jerry W. Herndon; Wayne P. Bailey (57) ABSTRACT

Different programs are broadcasted in a plurality of channels. A broadcast program which transmits same data in repetition is reserved in such programs to download the data. The GUI part 250 displays EPG data indicating a broadcast time zone of a data broadcast program and the like. When a user select and reserves a program, the virtual program processing part 224 groups the selected program into a virtual program in which priorities interfere each other. The priority processing part 222 assigns a unique priority to each reserved program for each virtual program depending on user's operation. The reception control part 230 controls a broadcast receiving apparatus (not shown) to download data of a program which is assigned the highest priority at each time.

15 Claims, 8 Drawing Sheets

| Start time | End time | Program Name | Channel # | Other Detailed Information Necessary for Receiving Program |
|---|---|---|---|---|
| | | | | |

| Assurance Mark | Priority | Broadcast Time | Program Name |
|---|---|---|---|
| ○ | 1 | 7:00 ~ 9:00 | Program a |
| ○ | 2 | 9:00 ~ 11:00 | Program c |
|  | 3 | 10:00 ~ 12:00 | Program d |
|  | 4 | 7:00 ~ 10:00 | Program b |

FIG. 8

| Priority | Start Time | End Time | Program Name | Channel # | Other Detailed Information Necessary for Receiving |
|---|---|---|---|---|---|
|  |  |  |  |  |  |

FIG. 9

| Virtual Start Time | Virtual End Time | List or Array of Programs Belonging to this Virtual Program |
|---|---|---|
|  |  |  |

DATA RECEIVING APPARATUS AND METHOD

BACKGROUND OF THE INVENTION

This invention relates to data receiving apparatus and method for receiving data transmitted in temporally overlapped fashion over a plurality of channels on priority basis when same data is transmitted for distribution to users in multiple times within a given time zone (transmitting in repetition) over each channel, such transmission being in parallel across the plurality of transmission channels.

Specifically, this invention relates to data receiving apparatus and method for receiving on a suitable priority basis data which is transmitted in repetition in each of programs broadcasted in parallel over a plurality of channels in the area of satellite data broadcast.

PRIOR ART

As disclosed in "Full picture of Next Generation Digital Television", special edition, Nikkei Media, Nikkei Business Publications Inc., 1997, ISBN4-8222-0882-6, pp. 33–38 (reference 1), for example, a digital data broadcast (hereinafter simply referred to "data broadcast) has been in commercial use in which same digital data is unilaterally broadcasted in multiple times from a satellite and the like as a data broadcast program (hereinafter simply referred to "program) within a predetermined time zone over multiple transmission channels.

In order for a user to download the data using the data broadcast, it is enough for one of multiple transmissions (repetition) of data to be successfully received in a broadcast time zone.

When it is intended to fully obtain entire information of a program in receiving a TV broadcast in this case, the user has to continuously receive signals/data of a program from the beginning to the end.

In contrast to receiving a TV broadcast, once one of multiple transmissions of data is successfully received (downloaded) from one program in receiving data broadcast, there is no need for the user to further receive data from the same program so that the user can switch to downloading data of a program broadcasted in another channel in the same time zone.

In short, if the user can successfully receive at least one of multiple transmissions of data of programs in receiving data broadcast, it is possible to fully download entire data from each of multiple programs broadcasted in temporally overlapped fashion over different channels.

A convenience would be obtained if a program can be reserved so as to allow data to be downloaded from each of programs overlapping temporally.

As an apparatus for reserving a program while allowing temporal overlap to download data in receiving data broadcast, "Sky PerfecPC! Data Board Digital CS Viewer Ver 1.0 (trademark of NEC)" can be cited.

This apparatus is so configured as to accept reservations of all temporally overlapping programs, preferentially download data of a program for which broadcasting started in earlier time and, when programs having a same start time of broadcasting overlap, preferentially download data of a program for which broadcasting ends in earlier time.

However, because it is uncertain at what timing and how many times data is transmitted or repeated within a program time zone, downloading may not totally successful from all temporally overlapping programs when they are reserved.

Therefore, if data of a data broadcast is simply downloaded with a priority as found in the above described apparatus, data which is not important to the user may be downloaded depending on the time of start and end of programs, and downloading of data which is very important to the user may end up with a failure.

Although such inexpediency seems to be resolved by simply assigning a priority to a program which the user reserved and downloading data from programs simply according to the assigned priority, assignment of priority would be a tremendous work when many programs are reserved if all reserved programs are to be assigned a unique priority.

In addition, if the priority once assigned is to be changed, the user has to reassign all the priorities from the beginning.

Further, if a program once reserved is canceled or additional program is reserved later, the user has to reassign the priority entirely.

While there are many patent applications of a scheme of allocating communication channels according to a priority, including PUPA61-202541, PUPA03-30530, PUPA04-19919, PUPA07-288497, and PUPA09-307495, they relate to a method of selecting a data transmitting communication channel in the sending side and fails to disclose a scheme which is suitable for receiving data broadcast which allows a receiving program to be selected according to a priority in the receiving side.

SUMMARY OF THE INVENTION

This invention is conceived in view of the above described problem of the prior art technology and aims at provision of data receiving apparatus and method suitable for reserving a program of a data broadcast which transmits same data in repetition in each of different programs broadcasted over multiple channels, and downloading data from the reserved program.

It is another object of this invention to provide data receiving apparatus and method which allows a user to reserve a program of temporally overlapping data broadcasts with an arbitrary priority assigned thereto to download the data.

It is a further object of this invention to provide data receiving apparatus and method which allows a user to reserve a program of temporally overlapping data broadcasts with an arbitrary priority assigned thereto conforming to the user's convenience to download the data.

It is a further object of this invention to provide data receiving apparatus and method which allows a priority to be simply assigned to programs of temporally overlapping data broadcasts and further allows the priority once assigned to be easily changed even after a program has been once reserved and the priority has been assigned.

It is a further object of this invention to provide data receiving apparatus and method which allows the priority to be easily reassigned even after the reservation of a program is canceled or added.

DESCRIPTION OF REFERENCE NUMBERS

1: Data broadcast receiving apparatus
  100: Computer
  102: CPU
  104: Input device
  106: Display device
  108: Storage device
  110: Broadcast receiving apparatus
  120: Data broadcast satellite 2: Data receiving software
  200: EPG receiving part
  210: Reservation processing part
  212: Reservation addition processing part
  214: Reservation canceling part
  220: Program data processing part
  222: Priority processing part
  224: Virtual program processing part
  226: Reserved program processing part
  230: Reception processing part
  232: Storage control part
  236: Program end processing part
  238: Broadcasting program extracting part
  240: Priority determination part
  250: GUI part

3: OS

Solution of the Objectives

Data Receiving Apparatus

In order to achieve the above objectives, this invention provides a data receiving apparatus comprising; reservation accepting means for accepting a reservation of one or more data broadcast programs which may be overlapped each other in time zone and in which same broadcasting data is transmitted in multiple times (transmitted in repetition), grouping means for grouping said reserved one or more data broadcast programs into one or more groups which interfere each other with respect to a priority (virtual programs), priority assigning means for assigning a priority such that each of said data broadcast programs is assigned a priority which is at least unique at a same time for each of said virtual programs, and data receiving means for receiving at least once one or more receivable ones of said broadcast data which are transmitted in repetition in each of said reserved data broadcast programs according to said priority assigned to each of said data broadcast programs.

Preferably, said grouping means groups multiple data broadcast programs overlapping each other in a time zone (directly overlapping), data broadcast program further overlapping said directly overlapping data broadcast program in a time zone (indirectly overlapping), and data broadcast program further overlapping said indirectly overlapping data broadcast program in a time zone into a same virtual program, and said priority assigning means assigns a unique priority to each of said reserved data broadcast programs in each of said virtual program.

Preferably, said reservation accepting means further accepts cancellation of a reservation of said reserved data broadcast program or reservation of a new data broadcast program, and said grouping means removes said canceled data broadcast program from said virtual program or adds said newly reserved data broadcast program to regroup said virtual program.

Reservation Accepting Means

In the data receiving apparatus of this invention, the reservation accepting means accepts a reservation of one or more data broadcast broadcasted via multiple transmission channels while permitting temporal overlap in response to user's operation.

Grouping Means

The grouping means determines the relationship of overlap of broadcast time zones of reserved programs and groups into the virtual program the programs included in a same group which are so related each other that they can not be independently prioritized because prioritization interferes each other and they need be prioritized relatively each other.

The grouping means further determines overlap of the broadcast time zones of added or deleted reserved programs and regroups into the virtual program when a reserved program is deleted and a reservation of a program is added.

Virtual Program

The virtual program is defined as a group in which priorities assigned to a plurality of programs need be at least different each other at a same time because the broadcast time zones overlap directly or indirectly and the assigned priorities interfere each other.

For simplicity of description, a specific example is described hereunder in which the virtual program is defined as a group in which each program included in a same group is assigned a unique priority unless otherwise mentioned.

Direct Overlap

For example, when the broadcast time zone of a program A is from 7:00 to 9:59 while the broadcast time zone of a program B is from 8:00 to 10:59, the programs A and B are in a relationship in which they overlap directly.

Similarly, when the broadcast time zone of a program D is from 11:00 to 13:59 while the broadcast time zone of a program E is from 13:00 to 13:59, for example, the programs D and E are in a relationship in which they overlap directly.

In short, when a plurality of programs overlap entirely or partly each other, they are in a directly overlapping relationship. It is without saying that directly overlapping programs can not be assigned a same priority.

Indirect Overlap

For example, when the broadcast time zone of the program C is from 10:00 to 11:59, the program C directly overlaps the program B, D but the programs B, D do not directly overlap each other.

If the programs B, C, D are reserved with the highest priority 1 assigned to the program B, the program C can not naturally be assigned the same priority 1.

If the program C is then assigned the next highest priority 2, the program D can not be assigned the same priority 2 as the program C and has to be in the lowest priority 3.

As such, the relationship among programs the priorities of which interfere each other, such as programs which do not directly overlap each other but have a directly overlapping program in common is referred to as indirect overlap.

Further for example, when the programs B, C, D, E are reserved, there is an interference of priority between indirectly overlapping programs (the program D for the program B, and the program C for the program E) and directly overlapping programs, as is the case of the programs B and E.

Further, when all the programs A–E are reserved, there is an interference of priorities between programs having an indirectly overlapping program C in common as is the case of the programs A and E.

These programs are also in an indirectly overlapping relationship.

As described so far in the above, the virtual program can be defined as a group of directly or indirectly overlapping programs.

Conversely, because there is no interference between programs which do not belong to a same virtual program, a reserved program can be assigned an independent priority for each virtual program.

Therefore, when a reserved program is deleted, only the virtual program to which the deleted or added program belongs may be divided and the priorities may be reassigned.

The priorities can be changed with the change confined within the virtual program.

When a new program is reserved, it is added to programs which have been so far reserved, the virtual program is regrouped, and only the program included in the changed virtual program is re-prioritized;

Priority Assigning Means

The priority assigning means assigns a priority to each program reserved at any time such that the priority of each program reserved at a same time is at least unique, i.e., a program reserved at any time is assigned a differing priority, in accordance with prioritizing operation by a user in each virtual program.

In a simplest example, each program included in a virtual program is assigned a differing priority, namely, a unique priority in the virtual program as described in the above.

When grouping of programs into a virtual program is changed by deletion of a reserved program or a reservation of a new program, the priority assigning means reassigns priorities only to programs belonging to the virtual program in which the change occurred.

When the user effects an operation to change the priority, for example, the priority assigning means reassigns priorities only for the virtual program including the programs which subject to the change.

Data Receiving Means

The data receiving means receives data of a program of the highest priority among programs reserved at each time point.

When data of the program has been received a necessary number of times, one or more times, the data receiving means terminates receiving the data without receiving data of that program even if the broadcast time zone of that program has not been exhausted.

When another program of a lower priority which overlaps in a broadcast time zone remains not received after necessary data reception of a program is completed, the data receiving means receives such another program.

A case where data of each reserved program is received once is described hereunder as an example unless otherwise mentioned.

Data Receiving Method

The data receiving method comprises; accepting a reservation of one or more data broadcast programs in each of which same broadcast data is transmitted in multiple times (transmitted in repetition) and the time zones of which may overlap each other, grouping each of said reserved data broadcast programs into one of groups in which priorities interfere each other (virtual programs), assigning a priority to each of said data broadcast program such that the priority thereof is at least unique at a same time in each of said virtual programs, and receiving receivable one of one or more of said broadcast data which is transmitted in repetition in each of said reserved data broadcast program at least once according to said priority assigned to each of said data broadcast program.

Recording Medium

The recording medium records a program for causing a computer to execute; a reservation accepting step of accepting a reservation of one or more data broadcast programs in each of which same broadcast data is transmitted in multiple times (transmitted in repetition) and the time zones of which may overlap each other, a grouping step of grouping each of said reserved data broadcast programs into one of groups in which priorities interfere each other (virtual programs), a priority assigning step of assigning a priority to each of said data broadcast program such that the priority thereof is at least unique at a same time in each of said virtual programs, and a data receiving step of receiving receivable one of one or more of said broadcast data which is transmitted in repetition in each of said reserved data broadcast program at least once according to said priority assigned to each of said data broadcast program.

Mode of Practicing the Invention

The mode of practicing this invention is now described hereunder.

Data Broadcast

The data receiving method of this invention is described first of all.

Figure 1:
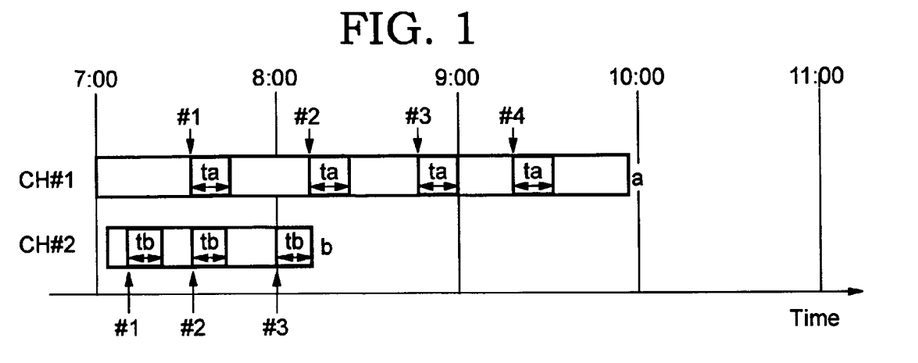
FIG. 1 is a chart illustrating broadcast time zone of a program in a data broadcast and a timing of data transmission.

FIG. 1 is a chart illustrating broadcast time zone of a program in a data broadcast and a timing of data transmission.

In the data broadcast, temporally overlapping programs (programs a, b) are broadcasted via a plurality of broadcast channels (CH#1, CH#2) as shown in FIG. 1.

During the broadcast time zone of the programs a, b, same data is broadcasted in repetition multiple times (more than 2 times, 4 times; #1–#4 for the program a, 3 times; #1–#3 for the program b, for example) for a predetermined length of time ($t_a$, $t_b$ for the programs a, b).

As seen from FIG. 1, if the first broadcast of the program b is successfully received, for example, one of the first to the fourth broadcasts of the program a can be received using the rest of time.

As such, in receiving data broadcast, both temporally overlapping programs can be reserved and successfully received (downloaded) from the both programs.

Figure 2:
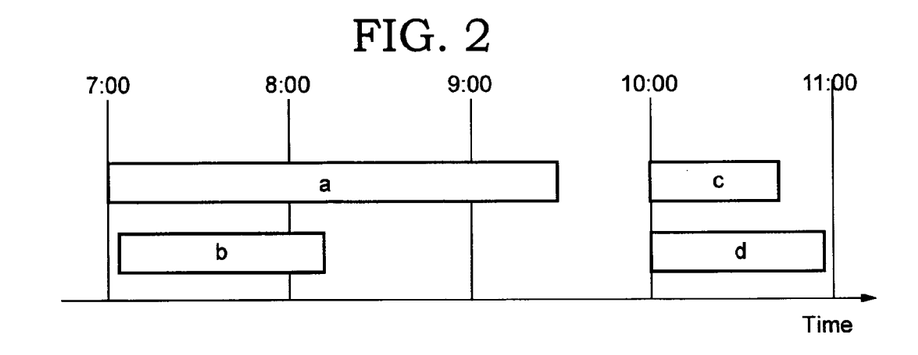
FIG. 2 is a first chart showing the broadcast time zone of a program in a data broadcast.

FIG. 2 is a first chart showing the broadcast time zone of a program in a data broadcast.

As shown in FIG. 2, when a program a and a program b which are temporally overlapped are reserved while a program c and a program d which are temporally overlapped are reserved, the user may desire that the data of the program b never fail to be downloaded while the data of the program a may fail to be downloaded.

Also, the user may somehow know that the data of the program d is broadcasted 3 times and the data of both the programs c and d can be successfully downloaded if the program d is downloaded after the program c is successfully downloaded.

The data receiving method of this invention allows a program of a data broadcast to be prioritized based on user's desire and knowledge and allows the data of a program to be downloaded according to the priority to reliably receive the data of a program which the user strongly wants to successfully download and to download the data of programs in a sequence which is advantageous to the user.

Data Receiving Methods

Figure 3:
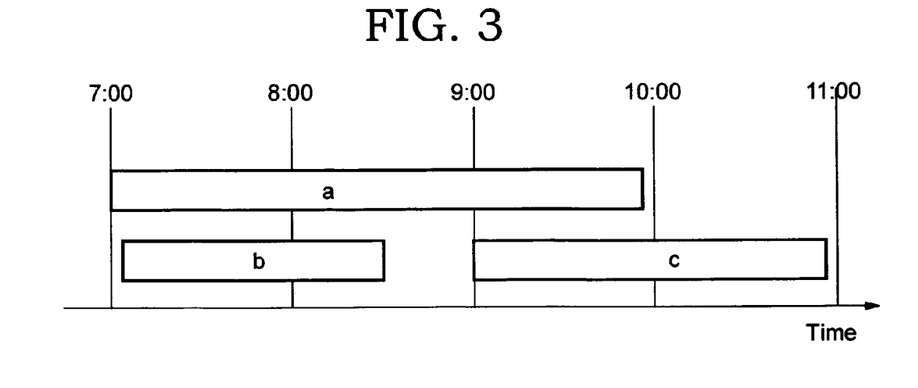
FIG. 3 is a second chart showing the broadcast time zone of a program in a data broadcast.

FIG. 3 is a second chart showing the broadcast time zone of a program in a data broadcast.

Figure 4:
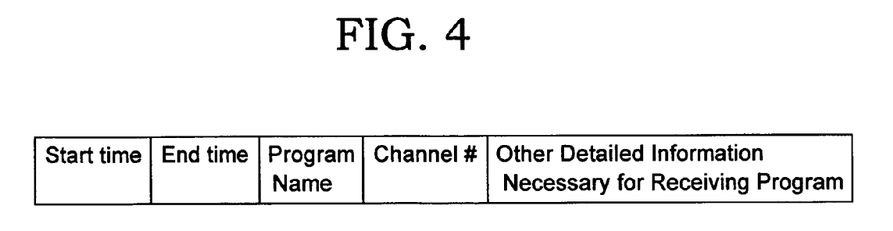
FIG. 4 is a chart showing EPG data including information necessary for receiving data, such as a broadcast time zone of programs in a data broadcast.

FIG. 4 is a chart showing EPG data including information necessary for receiving data, such as a broadcast time zone of programs in a data broadcast.

For example, when the broadcast time zones of the programs a–c are set to 7:00–9:59, 7:15–8:30, and 9:00–10:59, the broadcast time zones of the program a and the program b, and the broadcast time zones of the program c and the program b overlap each other.

The broadcast time zone (start time, end time) of programs, the title of the programs, the broadcast channel numbers in which the programs are broadcasted, and other detailed information necessary for receiving the programs are provided from the data sending side to the data receiving side as EPG (Electric Program Guide) data as shown in FIG. 4.

Therefore, if it is desired to reserve all the programs a–c with a priority assigned to download the data, the programs a and b as well as the programs b and c can not be assigned a same priority.

Conversely, if programs temporally overlapping at an arbitrary time are differently prioritized, downloading can be executed according to only the sequence determined by the priority which the user assigned.

The data receiving method of this invention determines the extent in which priorities interfere each other in assigning a priority-(virtual program) based on the broadcast time zone of a reserved data broadcast program and allows each program to be assigned a priority with the assignment confined within each virtual program.

In this manner, the data receiving method of this invention assures that priorities of programs overlapping at an arbitrary time are different (unique) each other to provide a user with a convenience of assigning a priority to a program even when programs included in each virtual program overlap temporally.

Virtual Program

A virtual program is further described.

A virtual program is defined as a group of programs which need be prioritized relatively each other because they interfere each other in assigning a priority.

Specifically, a plurality of programs of which the broadcast time zones overlap temporally each other and which satisfy the relationship shown in the table 1 given below (direct overlap), such as the programs a and b shown in FIG. 3 are grouped in a same virtual program.

Table 1
Start time of a<Start time of b<End time of a or
Start time of b≦Start time of a<End time of b Also, a plurality of programs which do not directly overlap but have a directly overlapping program (program a) in common (indirectly overlapping), such as the programs b and c, are included in a same virtual program because the priorities interfere each other via the program a.

Further, a plurality of programs which do not directly overlap each other but have an indirectly overlapping program in common, and a plurality of programs which do not directly overlap each other but have a directly overlapping program and an indirectly overlapping program in common are included in a same virtual program because the priorities interfere each other.

Data Receiving Apparatus 1

Figure 5:
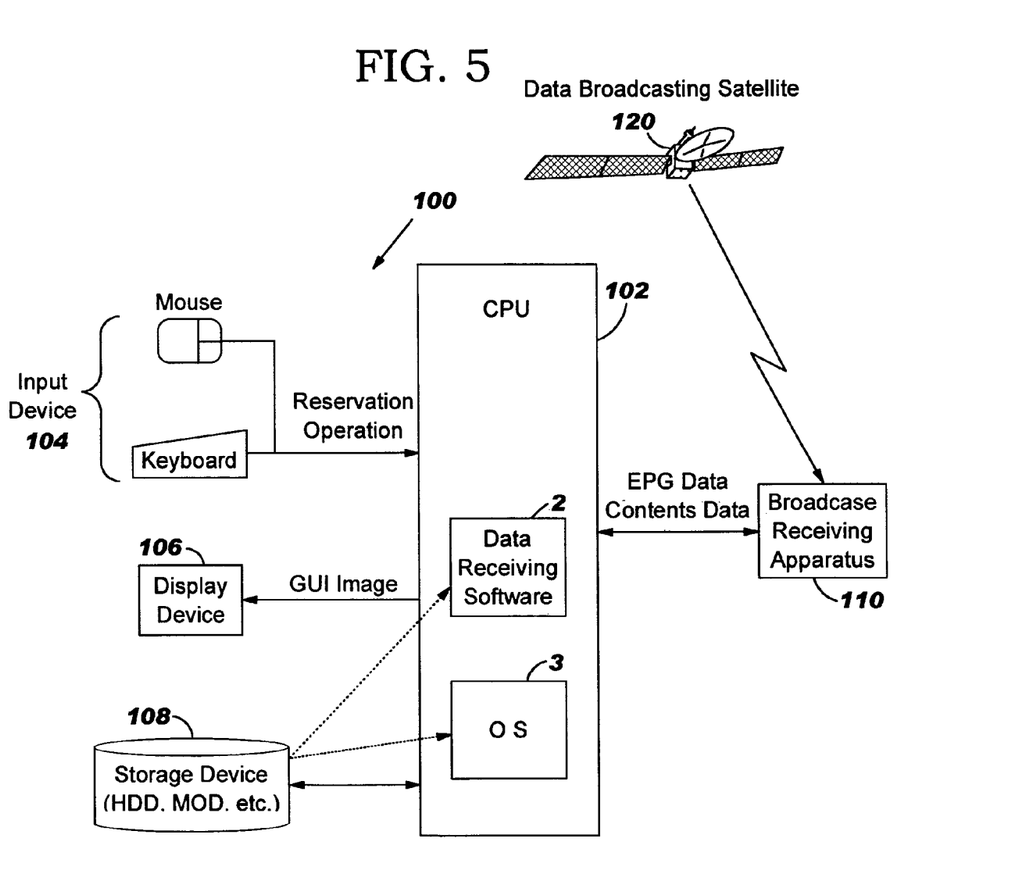
FIG. 5 is a diagram showing the configuration of the data broadcast receiving apparatus implementing the data receiving method of this invention.

FIG. 5 is a diagram showing the configuration of the data broadcast receiving apparatus 1 implementing the data receiving method of this invention.

As shown in FIG. 5, the data broadcast receiving apparatus 1 comprises a computer 100 and a broadcast receiving apparatus 110.

The computer 100 is a conventional personal computer, for example, and comprises a CPU 102, an input device 104, a display device 106 and a storage device 108.

With these components, the data broadcast receiving apparatus 1 implements the data receiving method of this invention.

Specifically, the data broadcast receiving apparatus 1 executes a data receiving software 2 on an OS (Operating System) 3. The data receiving software 2 reserves a data broadcast program broadcasted by a data broadcasting satellite 120 according to a reservation operation by a user and assigns a unique priority to each of the reserved programs at an arbitrary time (for each virtual program) according to the EPG data received from the data broadcasting satellite 120 and a prioritizing operation by the user.

The data receiving software 2 further receives the reserved data broadcast program according to the priority at each time point and stores it in the storage device 108.

CPU 102

The CPU 102 comprises a CPU, a memory and a peripheral circuit therefor and load the data receiving software 2 and the OS 3 from the storage device 108 to the memory for execution.

Input Device 104

The input device 104 comprises a keyboard and a mouse, etc., and receives a reservation operation and a prioritizing operation by the user for output to the CPU 102 (data receiving software 2).

Display Device 106

The display device 106 is a CRT display device or an LCD display device, etc., and displays a GUI image and the like generated by the CPU 102 (data receiving software 2) for presentation to the user.

Storage Device 108

The storage device 108 is a hard disk device (HDD), a magnet-optical disk device (MOD) or a flexible disk device, etc., stores the data receiving software 2 and the OS 3 in the hard disk, a magneto-optical disk or a flexible disk, and reads out the stored data receiving software 2 and OS 3 for output to the CPU 102.

The storage device 108 also stores data received by the broadcast receiving apparatus 110 and the CPU 102 (data receiving software 2).

Broadcast Receiving Apparatus 110

The broadcast receiving apparatus 110 receives time data indicating the time, EPG data and broadcast data broadcasted by the data broadcasting satellite 120 under the control of the CPU 102 (data receiving software 2) and outputs the received EPG data and broadcast data to the CPU 102 (data receiving software 2).

OS 3

The OS 3 is a general purpose OS for a personal computer such as Windows (trademark of Microsoft) and OS/2 (trademark of International Business Machines Corporation), for example and manages the hardware and the software in the CPU 102.

The OS 3 also has a clock function and outputs time data indicating a measured time to the data receiving software 2.

Data Receiving Software 2

Figure 6:
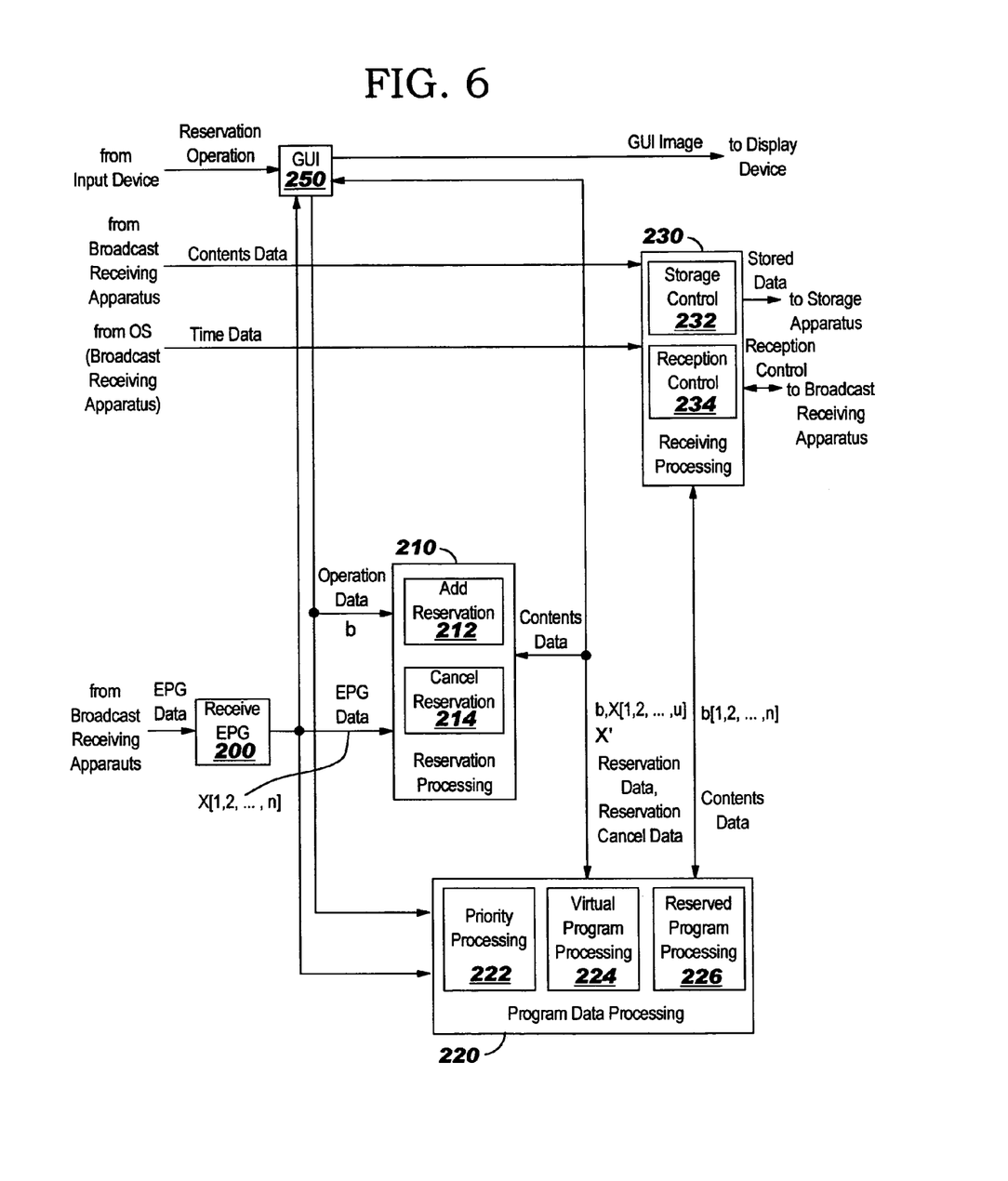
FIG. 6 is a diagram showing the configuration of the data receiving software shown in FIG. 5.

FIG. 6 is a diagram showing the configuration of the data receiving software 2 shown in FIG. 5.

As shown in FIG. 6, The data receiving software 2 comprises an EPG receiving part 200, a reservation processing part 210, a program data processing part 220, a reception processing part 230 and a GUI part 250.

The reservation processing part 210 comprises a reservation addition processing part 212 and a reservation cancellation processing part 214. The program data processing part 220 comprises a priority processing part 222, a virtual program processing part 224 and a reserved program processing part 226. The reception processing part 230 comprises a storage control part 232 and a reception control part 234.

With these components, the data receiving software 2 implements the data receiving method of this invention and stores broadcast data received (downloaded) in the storage device 108.

EPG Receiving Part 200

The EPG receiving part 200 receives EPG data of each program (FIG. 4) inputted from the broadcast receiving apparatus 110 for storage and outputs it to the program data processing part 220 and the GUI part 250.

GUI part 250

The GUI part 250 indicates the broadcast time zone of each program using the EPG data inputted from the EPG receiving part 200 and generates a reservation GUI image which prompts the user an operation to newly reserve a program, add a reservation of a program and cancel the reservation of a program for display in the display device 106.

Figure 7:
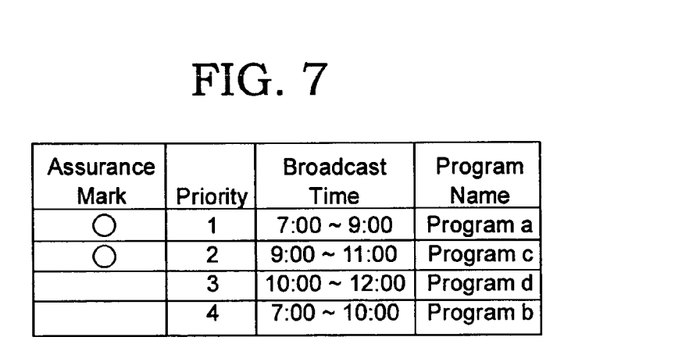
FIG. 7 is a chart showing a prioritization GUI image which the GUI part shown in FIG. 6 displays in the display device 106 (FIG. 5).

FIG. 7 is a chart showing a prioritization GUI image which the GUI part 250 shown in FIG. 6 displays in the display device 106 (FIG. 5).

The GUI part 250 displays a reserved program inputted from the program processing part 220, the broadcast time zone of the reserved programs and the priorities assigned to the reserved programs.

The GUI part 250 also generates a prioritization GUI image (FIG. 7) which prompts the user to assign a priority and change the priority using the data inputted from the program data processing part 220 indicating the start time and the end time of each virtual program.

Such data inputted from and outputted to the program data processing part 220 and other components is hereinafter collectively referred to program data.

The GUI part 250 displays the title of the reserved program and the broadcast time zone, and an input frame designating a priority corresponding to the title and the broadcast time zone of each program in the prioritization GUI image for each virtual program as shown in FIG. 7.

When a program has a higher priority than all other programs temporally overlapping that program in a broadcast time zone, the GUI part 250 also puts an assurance mark indicating that the program is certainly received.

The user assigns a unique priority for each reserved program of each virtual program by pointing the prioritization input frame and inputting a priority in the pointed input frame using the keyboard of the input device 104.

The GUI part 250 receives a user's operation effected to the GUI image displayed in the display device 106 to reserve a program or add/cancel a reserved program (reservation operation), and a user's operation to assign a priority to a reserved program or change the priority assigned to a reserved program (prioritization operation).

When the user inputs the end of these operation, the GUI part 250 further generates reservation operation data indicating a reservation operation and prioritization operation data indicating a prioritization operation (hereinafter collectively referred to operation data) and outputs them to the reservation processing part 210 and the program data processing part 220.

Reservation Addition Processing Part 212

In the reservation processing part 210, the reservation addition processing part 212 selects a newly reserved or additionally reserved program according to the reservation operation data (b) inputted from the GUI part 250 among the programs (X[1,2, . . . n]) which the EPG data inputted from the EPG receiving part 200 indicates, and generates reservation data (b, X[i, . . . , k], $1^{\leq k \leq n}$) including EPG data indicating the selected program for output to the program data processing part 220.

Reservation Cancellation Processing Part 214

The reservation cancellation processing part 214 selects a reserved program to be canceled among the programs indicated by the program data inputted from the program data processing part 220 according to the reservation operation data inputted from the GUI part 250, and generates reservation cancellation data (X') indicating the program the reservation of which is canceled for output to the program data processing part 220.

Reserved Program Processing Part 226

Figure 8:
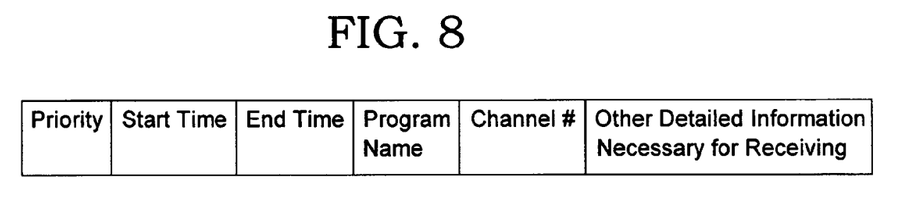
FIG. 8 is a chart showing reserved program data which the program data processing part shown in FIG. 6 manages and controls.

FIG. 8 is a chart showing reserved program data which the program data processing part 220 shown in FIG. 6 manages and stores.

In the program data processing part 220, the reserved program processing part 226 manages and stores reserved program data indicating a program which is reserved by the reservation processing part 210 and assigned a priority by the prioritization processing part 222, and outputs it to the priority processing part 222, the reception processing part 230 and the GUI part 250.

The reserved program data includes the priority, the start time, the end time, the title, the channel number of the reserved programs and other information necessary for receiving the program, for example, as shown in FIG. 8.

In short, the reserved program data contains the EPG data (FIG. 4) of the reserved programs to which priorities assigned by the priority processing part 222 are added.

The reserved program processing part 226 adds the EPG data included in a new reservation data each time reservation data is inputted from the reservation processing part 210.

The reserved program processing part 226 also deletes a program for which the broadcast end time elapsed and a program which has been downloaded (ended program) from the reserved program data each time program data indicating an ended program is inputted from the program end processing part 236.

When the reserved program processing part 226 is notified of a priority corresponding to a newly reserved program, it adds the priority to the reserved program data of the newly reserved program.

The reserved program processing part 226 also deletes reserved program data of a program indicated by the reservation cancellation data (x') each time the reservation cancellation data (x') is inputted from the reservation processing part 210.

Virtual Program Processing Part 224

Figure 9:
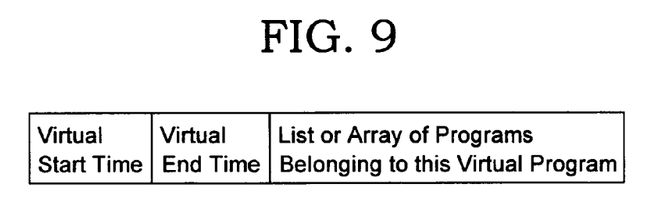
FIG. 9 is a chart showing virtual program data generated by the virtual program processing part shown in FIG. 6.

FIG. 9 is a chart showing virtual program data generated by the virtual program processing part 224 shown in FIG. 6.

The virtual program processing part 224 groups a reserved program into a virtual program based on the EPG data included in the reservation data inputted from the reservation processing part 210.

The virtual program processing part 224 generates and stores virtual program data including a list or an array (a link to the reserved program data of programs belonging to a virtual program, FIG. 8, for example) indicating the start time, the end time of a virtual program and programs belonging to that virtual program as shown in FIG. 9, and outputs it to the prioritization processing part 222, the reserved program processing part 226 and the GUI part 250.

The virtual program processing part 224 also groups a changed program into a virtual program using the changed reserved program data each time the reservation program processing part 226 changes the reserved program data by generating or deleting reservation program data of a new program.

Figure 10:
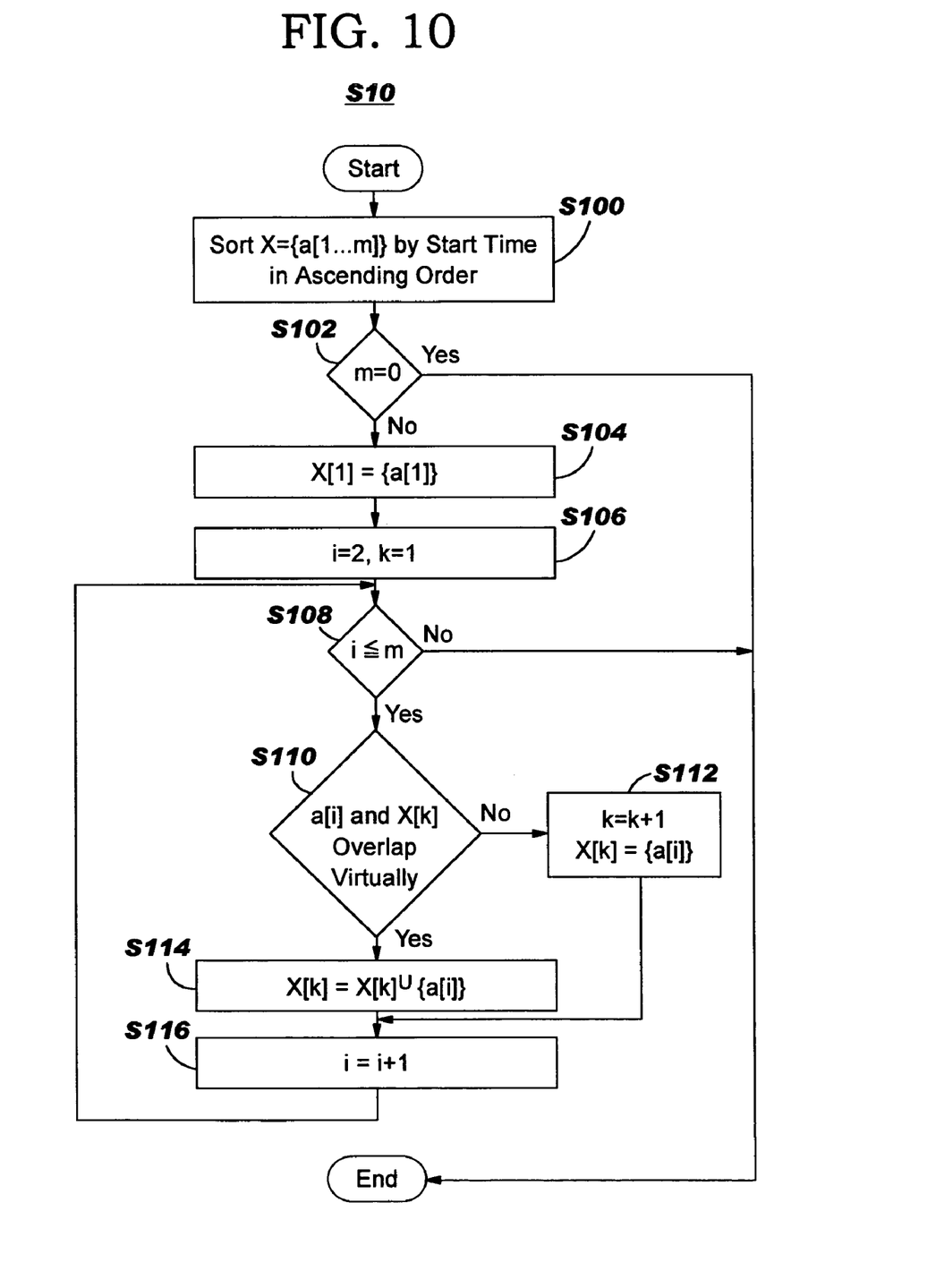
FIG. 10 is a flow chart showing a process (S10) in which the virtual program processing part regroups the reserved program into a virtual program each time the reserved program processing part deletes reserved program data of a new program.

FIG. 10 is a flow chart showing a process (S10) in which the virtual program processing part 224 regroups the reserved program into a virtual program each time the reserved program processing part 226 deletes reserved program data of a new program.

A process in which the virtual program processing part 224 regroups the reserved program into a virtual program when a reserved program is deleted is now described hereunder with reference to FIG. 10.

AS shown in FIG. 10, in step 100 (S100), the virtual program processing part 224 deletes from reserved programs included in a virtual program X a program which is indicated by the reserved program processing part 226 as being deleted and sorts the remaining programs a [1, 2, . . . , m] in the ascending order the earliest start time of a program first.

In step 102 (S102), the virtual program processing part 224 determines whether or not there is a remaining program, i.e., whether or not the number m of the remaining programs [1, 2, . . . , m] is 0. If there remains no program, the virtual program X is deleted and the process is ended.

In step 104 (S104), the virtual program processing part 224 adds the program a [1] of the earliest start time among the remaining programs as an element of the virtual program X [1].

In step 106 (S106), the virtual program processing part 224 substitutes working variables I, k with values 2, 1.

In step 108 (S108), the virtual program processing part 224 determines whether or not the working variable I is no greater than a value m and proceeds to the process of S101 if the working variable I is no greater than the value m. Otherwise the process is ended.

In step 110 (S110), the virtual program processing part 224 determines whether or not the I-th program a [I] ($1 \leq i \leq m$) temporally overlaps any of programs included in the k-th virtual program X [k] (k=1, 2, . . . ) and proceeds to the process of S114 if it overlaps while proceeds to the process of S112 otherwise.

In step 112 (S112), the virtual program processing part 224 increments the working variable k (k=k+1) and further adds the I-th program to the new k-th virtual program as an element.

In step 114 (S114), the virtual program processing part 224 adds the l-th program a [I] to the k-th virtual program as an element (X[k]=X[k] U a [I]).

In step 116 (S116), the virtual program processing part 224 increments the working variable I (I=I+1).

By the above described process, the virtual program X'(a[1, . . . , m]) is divided into new virtual programs X[1]–X[k] as a result that the reservation of a program is canceled. When a reservation of a program is newly added, the virtual program processing part 224 sorts all programs included in the virtual program in the order of the start time in the process of S100 shown in FIG. 10 to regroup into a virtual program by performing the processes of S102–S116.

Prioritization Processing Part 222

The prioritization processing part 222 assigns a priority to each reserved program according to inputted priority data uniquely within a virtual program each time prioritization operation data is inputted from the GUI part 250 and notifies the reserved program processing part 226 of that.

Storage Control Part 232

Figure 11:
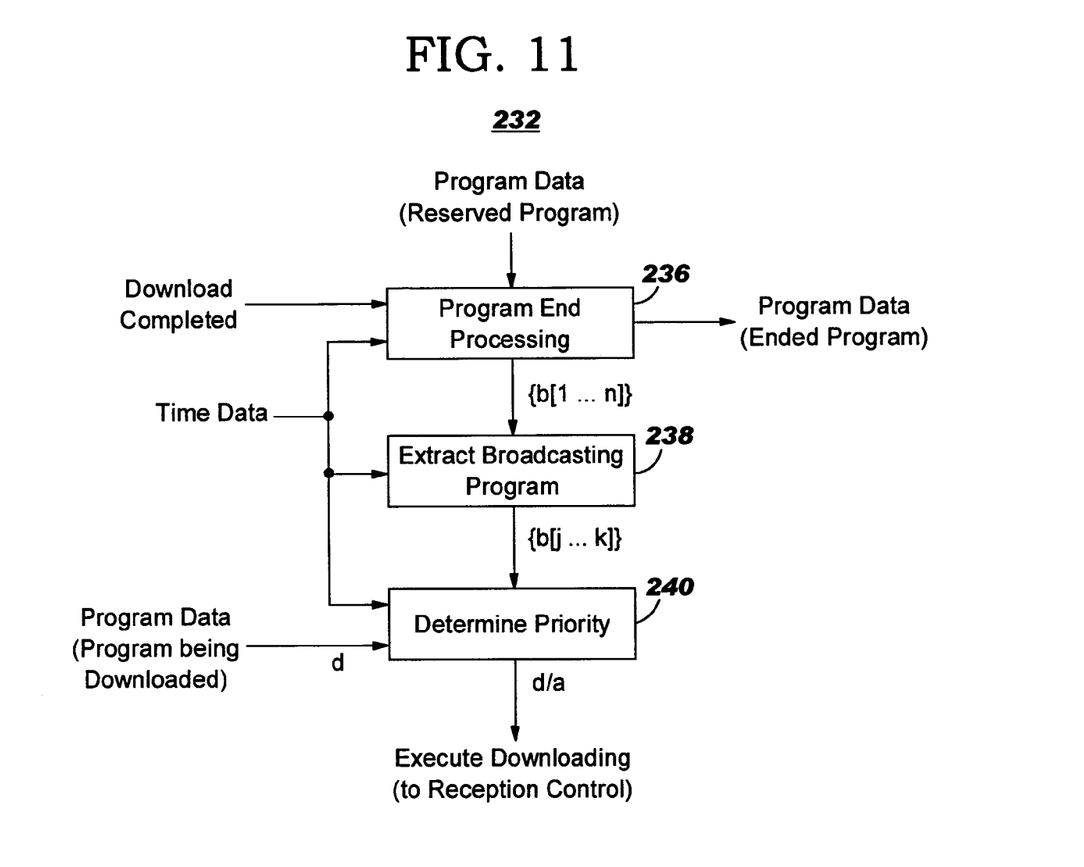
FIG. 11 is a diagram showing the configuration of the storage control part shown in FIG. 6.

FIG. 11 is a diagram showing the configuration of the storage control part 232 shown in FIG. 6.

As shown in FIG. 11, the storage control part 232 comprises an end program processing part 236, a broadcasting program extracting part 238 and a priority determination part 240.

In the reception processing part 230, the storage control part 232 controls the reception control part 234 to cause it to download broadcast data from a channel in which a program of the highest priority is broadcasted in each time from the start time to the end time of a reserved program data (FIG. 8) based on the time data inputted from the OS 3 (or time data sent along with the broadcast data and indicating a time in the manner similar to the time data supplied by the OS 3. A case where the time data is supplied from the OS 3 is described as a specific example).

Program End Processing Part 236

In the storage control part 232, the program end processing part 236 outputs reserved program data (b[1, 2, ... n]) inputted from the reserved program processing part 226 to the broadcasting program extracting part 238.

The program end processing part 236 checks reserved program data (FIG. 8) at a fixed time interval (1 minute interval, for example) based on the time data inputted from the OS 3 and outputs program data indicating a program for which broadcast time has expired and a program for which the reception control part 234 has notified that downloading has been completed (ended program) to the reserved program processing part 226 to have it deleted from the reserved program data.

The program end processing part 236 controls the broadcasting program extracting part 238 to have it delete a program which newly becomes an ended program from the reserved program data each time an ended program is newly generated.

Broadcasting Program Extracting Part 238

The broadcasting program extracting part 238 checks the reserved program data at a fixed time interval based on the time data from the OS 3 to detect a program being broadcasted (broadcasting program) at respective times and outputs reserved program data of the program being broadcasted (b[i, , , k]) to the priority determination part 240.

In other words, the broadcasting program extracting part 238 detects a reserved program satisfying the following relationship as a broadcasting program taking into consideration overhead α from the time when the storage control part 232 controls the reception control part 234 to the time when the reception control part 234 operates in response to the control.

$$t_0 - \alpha \leq t < t_c + \alpha$$

where, t is a time indicated by time data from the OS 3, $t_0$ is the start time of a program, and $t_c$ is the end time.

Priority Determination Part 240

The priority determination part 240 compares priorities of reserved program data of broadcasting programs z(b[i, , , k]) inputted from the broadcasting program extracting part 238 to select a program a of the highest priority.

The priority determination part 240 further compares the priority of a program d which the reception control part 234 is downloading at that time with the priority of the program a and controls the reception control part 234 to specify a program of the higher priority (a or d: a/d) for executing downloading.

Figure 12:
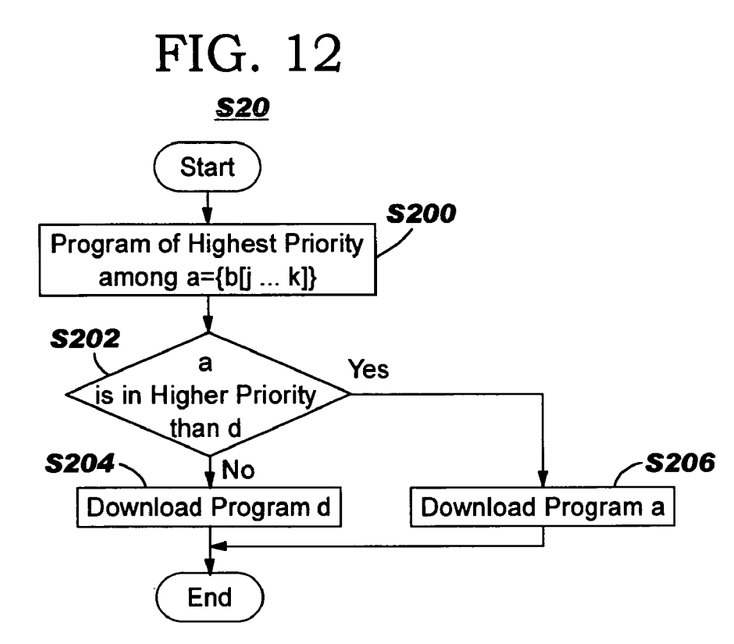
FIG. 12 is a chart showing a process in which the priority determination part shown in FIG. 6 selects one of the program a of the highest priority among the reserved program data and the program d being downloaded, whichever higher in the priority.

FIG. 12 is a chart showing a process in which the priority determination part 240 shown in FIG. 6 selects one of the program a of the highest priority among the reserved program data and the program d being downloaded, whichever higher in the priority.

As shown in FIG. 12, in step 200 (S200), the priority determination part 240 compares the priorities of reserved program data of the reserved programs to select the program a assigned the highest priority.

In step 202 (S202), the priority determination part 240 compares the priority of the program a with the priority of the program d being downloaded to determine whether or not the program a has a higher priority than the program d.

If the priority of the program a is higher than the program d, the priority determination part 240 controls the reception control part 234 to download the program a and ends processing while it proceeds to the process of S204 otherwise.

In step 204 (S204), the priority determination part 240 controls the reception control part 234 to download the program d in place of the program a.

Reception Control Part 234

The reception control part 234 (FIG. 6) controls the broadcast receiving apparatus 110 to receive a channel in which a program specified by the priority determination part 240 of the storage control part 232 and have the broadcast data of the program which the broadcast receiving apparatus 110 receives stored in the storage 108 to perform a downloading process.

Figure 13:
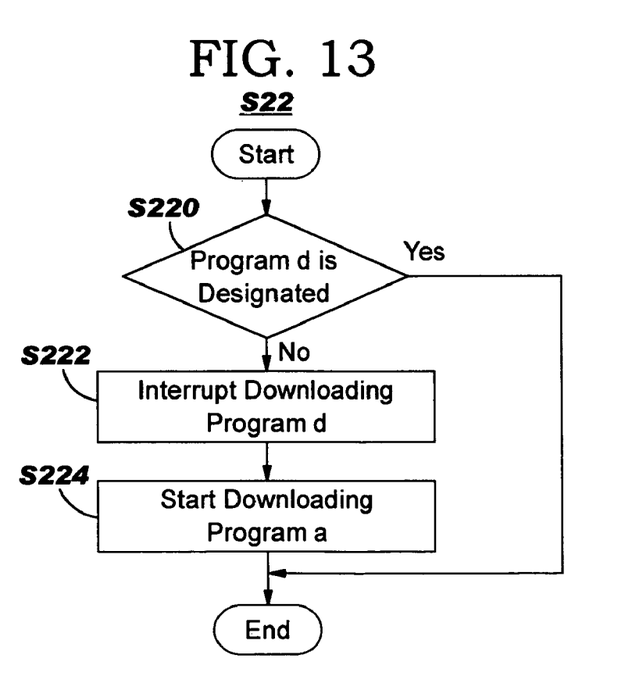
FIG. 13 is a flow chart showing the process (S22) in which the reception control part shown in FIG. 6 downloads a program specified by the priority determination part.

FIG. 13 is a flow chart showing the process (S22) in which the reception control part 234 shown in FIG. 6 downloads a program specified by the priority determination part 240.

In step 220 (S220), the reception control part 234 determines whether or not the priority determination part 240 specified the program d being downloaded and, if the program was specified, continues to download the program d to complete the process. Otherwise, it proceeds to the process of S222.

In step 222 (S222), the reception control part 234 interrupts downloading the program d.

In step 224 (S224), the reception control part 234 starts downloading the program a which is newly specified by the priority determination part 240.

Reservation of Program

Figure 14:
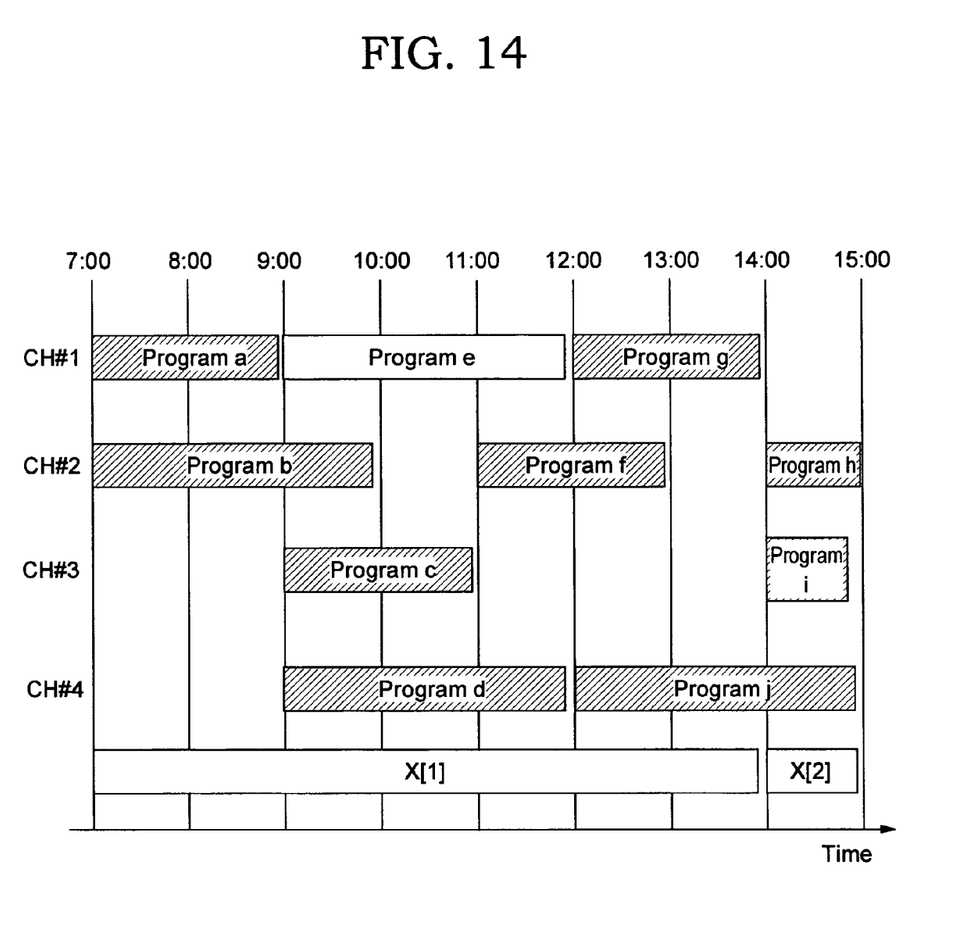
FIG. 14 is a chart showing the broadcast time zone of a data broadcast program.

FIG. 14 is a chart showing the broadcast time zone of a data broadcast program.

The overall operation of the data broadcast receiving apparatus 1 (data receiving software 2) is described hereunder with reference to FIG. 14.

The operation of a program reservation of the data broadcast receiving apparatus 1 (data receiving software 2) is described first of all by taking the time zone of the data broadcast program shown in FIG. 14 as a specific example.

The EPG receiving part 200 (FIG. 6) receives the EPG data (FIG. 4) received by the broadcast receiving apparatus 110 (FIG. 5) for storage and outputs it to the GUI part 250.

The GUI part 250 displays the time zone and the channels (CH1–CH4) in which each program (programs a–j) is broadcasted in the display device 106 as shown in FIG. 14 using the EPG data of each program from the EPG receiving part 200.

Further, the GUI part 250 generates a reservation GUI image (a GUI displaying the content of FIG. 14 as it is, for example) prompting the user an operation to newly reserve a program, add a reservation and cancel a reservation for display in the display device 106.

When the user clicks programs a, b, c, d, e, f, g, h, I shown in FIG. 14 using a mouse of the input device 104 for reservation, for example, the GUI part 250 receives the user's operation to change the color of a bar in the GUI (FIG. 14) indicating a reserved program and outputs reservation operation data indicating the reserved program to the reservation processing part 210.

The reservation addition processing part 212 of the reservation processing part 210 selects a program which is newly reserved or additionally reserved according to the reservation operation data from the GUI part 250 among programs indicated by the EPG data (FIG. 4) from the EPG receiving part 200 and generates reservation data including EPG data indicating the reserved program for output to the program data processing part 220.

The virtual program processing part 224 of the program data processing part 220 groups the reserved programs into virtual programs X[1], X[2] as shown in FIG. 14 based on the EPG data from the reservation processing part 210 to generate virtual program data (FIG. 9).

The GUI part 250 generates a prioritization GUI image (FIG. 7) which prompts the user to assign a priority and the like using the virtual program data generated by the virtual program processing part 224 and displays it in the display device 106.

When the user performs an operation to assign a unique priority for each virtual program in the prioritization GUI image, the GUI part 250 receives this operation and generates prioritization operation data (operation data) for output to the prioritization processing part 222.

The prioritization processing part 22 assigns a priority to each reserved program according to the priority data from the GUI part 250.

The reserved program processing part 226 manages and stores the reserved program data indicating the programs which are reserved, grouped into virtual programs and assigned a priority by the operation on the components so far described.

Addition of Program Reservation

The operation of adding a reservation of a program of the data broadcast receiving apparatus 1 (data receiving software 2) is now described.

When the user performs an operation to add a reservation of a program in the reservation GUI image (not shown) displayed by the GUI part 250, the GUI part 250 receives the reservation operation and outputs reservation operation data to the reservation processing part 210.

The reservation addition processing part 212 of the reservation processing part 210 selects a program of which the reservation operation data from the GUI part 250 indicates to add a reservation among programs indicated by the EPG data (FIG. 4), generates reservation data and outputs it to the program data processing part 220.

The virtual program processing part 224 adds a newly reserved program to programs so far reserved, resorts in the order of the program start time to perform the process shown in FIG. 10, regroups into virtual programs, and generates new virtual program data. For example, when a program k (not shown) for which the broadcasting time is from 13:00 to 14:59 is newly reserved, the virtual programs X[1], X[2] are regrouped into a single virtual program.

The GUI part 250 generates a prioritization GUI image (FIG. 7) which prompts the user to assign a priority and the like using the new virtual program data generated by the virtual program processing part 224 and displays it in the display device 106.

When the user performs an operation to assign a unique priority for each new virtual program in the prioritization GUI image, the GUI part 250 receives this operation and generates prioritization operation data (operation data) for output to the priority processing part 222.

The priority processing part 222 assigns a priority to each reserved program included in the virtual program in which a change has occurred by adding a reservation according to the priority data from the GUI part 250.

The reserved program processing part 226 manages and stores reserved program data indicating a program which is reserved, grouped into a virtual program and assigned a priority by the operation of the components so far described.

Program Reservation Deletion Operation

The operation of cancellation of a reserved program of the data broadcast receiving apparatus 1 (data receiving software 2) is now described.

When the user performs an operation to cancel a reservation of a program in the reservation GUI image (not shown) displayed by the GUI part 250, the GUI part 250 receives the reservation operation and outputs the reservation operation data to the reservation processing part 210.

The reservation addition processing part 212 of the reservation processing part 210 selects a program of which the reservation operation data from the GUI part 250 indicates to cancel the reservation and generates reservation data for output to the program data processing part 220.

The virtual program processing part 224 performs the process shown in FIG. 10 with the program of which the reservation is canceled being excluded from the programs so far reserved, regroups the virtual program in which the canceled program has been so far included, and generates new virtual program data.

In the example shown in FIG. 14, when the program d is canceled, the virtual program X[1] is divided into a virtual program including the programs a–c and a virtual program including the programs f, g.

The GUI part 250 generates a prioritization GUI image (FIG. 7) which prompts the user to assign a priority and the like using the new virtual program data generated by the virtual program processing part 224 and displays it in the display device 106.

When the user performs an operation to assign a unique priority for the virtual program which is newly regrouped by the cancellation of the reservation in the prioritization GUI image, the GUI part 250 receives this operation and generates prioritization operation data (operation data) for output to the priority processing part 222.

The priority processing part 22 assigns a priority to each reserved program according to the priority data from the GUI part 250.

The reserved program processing part 226 manages and stores reserved program data indicating a program which is reserved, grouped into a virtual program and assigned a priority by the operation of the components so far described.

Priority Change Operation

The priority change operation of the data broadcast receiving apparatus 1 (data receiving software 2) is now described hereunder.

When the user so far described performs an operation to change a priority on the prioritization GUI image, the GUI part 250 receives this operation and generates prioritization operation data (operation data) for output to the priority processing part 222.

The priority processing part 222 assigns a priority to each reserved program for each virtual program according to the priority data from the GUI part 250.

The reserved program processing part 226 manages and stores reserved program data indicating a program which is reserved, grouped into a virtual program and assigned a priority by the operation of the components so far described.

Download Process

The download operation of the data broadcast receiving apparatus 1 (data receiving software 2) is now described hereunder.

The reserved program processing part 226 (FIG. 6) manages and stores reserved program data which is settled after the reservation of a program, addition and cancellation of a program, and the change of a priority so far described.

The broadcast end processing part 236 of the storage control part 232 checks reserved program data (FIG. 8) from the reserved program processing part 226 at a fixed time interval and notifies the reserved program processing part 226 and the broadcasting program extracting part 238 of program data indicating a program for which broadcast time has expired and a program for which the reception control part 234 has notified that downloading has been completed (ended program) to have it deleted from the reserved program data.

The broadcasting program extracting part 238 checks the reserved program data at a fixed time interval and outputs reserved program data of the program being broadcasted to the priority determination part 240.

The priority determination part 240 selects a program a of the highest priority among the programs being broadcasted which are inputted from the broadcasting program extracting part 238 and further compares the priority of the program with the priority of a program which the reception control part 234 is downloading at that time to control the reception control part 234 to download a program of the higher priority.

The reception control part 234 controls the broadcast receiving apparatus 110 to receive a channel in which a program specified by the priority determination part 240 of the storage control part 232 is broadcasted and has the broadcast data of the program which the broadcast receiving apparatus 110 receives stored in the storage 108 to perform a downloading process.

Effect of the Invention

As described in the above, the data receiving apparatus and method of this invention are suitable for reserving a program of a data broadcast which transmits same data in repetition in each of different programs broadcasted over multiple channels, and downloading data from the reserved program.

The data receiving apparatus and method of this invention allow a user to reserve a program of temporally overlapping data broadcasts with an arbitrary priority assigned thereto to download the data.

The data receiving apparatus and method of this invention allow a user to reserve a program of temporally overlapping data broadcasts with an arbitrary priority assigned thereto conforming to the user's convenience to download the data.

The data receiving apparatus and method of this invention allow a priority to be simply assigned to programs of temporally overlapping data broadcasts and further allow the priority once assigned to be easily changed even after a program has been once reserved and the priority has been assigned.

The data receiving apparatus and method of this invention allow the priority to be easily reassigned even after the reservation of a program is canceled or added.

What is claimed is:

1. A data receiving apparatus for automatically scheduling the recording of broadcast programs without user intervention in the scheduling process, comprising:
   reservation accepting means for accepting reservation requests of one or more data broadcast programs that are sequentially and repetitively transmitted in groups over ones of multiple channels such that programs in different channels can overlap each other in time,
   a reception and storing means for recording one data broadcast program at a time, grouping means for grouping the reserved data broadcast programs into one or more groups in which each group contains programs that interfere with each other with respect to recording by the reception and recording means,
   priority assigning means for assigning a unique recording priority to each group and to each program within a group such that all of the reserved repeating programs can be recorded in sequence according to the assigned priorities.

2. The apparatus of claim 1 further comprising means responsive to a request to cancel a reserved program for re-prioritizing all remaining reservation requests.

3. The apparatus of claim 1 further comprising means responsive to a request to add an additional program to the reserved programs for re-prioritizing all reservation requests.

4. The apparatus of claim 1 wherein the grouping means further comprises:
   means for identifying reserved programs that overlap directly with each other or that indirectly overlap via another reserved program and
   means for placing all such directly or indirectly overlapping programs in the same group.

5. Apparatus for automatically scheduling without user intervention the recording of broadcast data programs that are sequentially and repetitively transmitted in groups over ones of multiple channels such that programs in different channels can overlap each other in time, comprising:
   structure for accepting reservation requests of one or more of the data broadcast programs,
   structure for grouping the reserved data broadcast programs into one or more groups in which each group contains programs that interfere with each other with respect to receiving in sequence, and
   structure for assigning a unique receiving priority to each group and to each program within a group such that all of the reserved repeating programs can be received in sequence according to the assigned priorities.

6. A method of automatically scheduling without user intervention the recording of broadcast data programs that are repetitively transmitted in groups over ones of multiple channels such that programs in different channels can overlap each other in time, comprising the steps of
   accepting reservation requests of one or more of the data broadcast programs, grouping the reserved data broadcast programs into one or more groups in which each group contains programs that interfere with each other with respect to receiving in sequence, and
   assigning a unique receiving priority to each group and to each program within a group such that all of the reserved repeating programs can be received in sequence according to the assigned priorities.

7. The method of claim 6 further comprising re-prioritizing all remaining reservation requests responsive to a request to cancel a reserved program.

8. The method of claim 6 further comprising re-prioritizing all reservation requests responsive to a request to add an additional program to the reserved programs.

9. The method of claim 6 wherein the step of grouping further comprises
   identifying reserved programs that overlap directly with each other or that indirectly overlap via another reserved program and
   placing all such directly or indirectly overlapping programs in the same group.

10. A computer program product for storing a program to control a computer that when executed on the computer automatically schedules without user intervention the recording of broadcast data programs that are repetitively transmitted in groups over ones of multiple channels such that programs in different channels can overlap each other in time, the method comprising the steps of accepting reservation requests of one or more of the data broadcast programs, grouping the reserved data broadcast programs into one or more groups in which each group contains programs that interfere with each other with respect to receiving in sequence, and assigning a unique receiving priority to each group and to each program within a group such that all of the reserved repeating programs can be received in sequence according to the assigned priorities.

11. The computer program product of claim 10 further comprising computer instructions for re-prioritizing all remaining reservation requests responsive to a request to cancel a reserved program.

12. The computer program product of claim 10 further comprising computer instructions for re-prioritizing all reservation requests responsive to a request to add an additional program to the reserved programs.

13. The computer program product of claim 10 wherein the step of grouping further comprises computer instructions for identifying reserved programs that overlap directly with each other or that indirectly overlap via another reserved program and computer instructions for placing all such directly or indirectly overlapping programs in the same group.

14. A method for automatically scheduling the recording of broadcast programs in a scheduling process, comprising:

accepting reservation requests of one or more data broadcast programs that are sequentially and repetitively transmitted in groups over ones of multiple channels such that programs in different channels overlap each other in time;

grouping, without user intervention, the reserved data broadcast programs into one or more groups in which each group contains programs that temporally interfere with each other; and assigning, without user intervention, a unique recording priority to each group and to each program within a group such that all of the reserved programs can be recorded in sequence according to the assigned priorities.

15. The method of claim 14, further comprising a step of overriding, by a user, one or more of the assigned recording priorities.

* * * * *

UNITED STATES PATENT AND TRADEMARK OFFICE
CERTIFICATE OF CORRECTION

PATENT NO.       : 7,017,179 B1
APPLICATION NO.  : 09/430733
DATED            : March 21, 2006
INVENTOR(S)      : Asamoto et al.

It is certified that error appears in the above-identified patent and that said Letters Patent is hereby corrected as shown below:

Col. 8, line 19: after "Start time of a" delete "<" and insert --$\leq$--.

Col. 10, line 50: after "data"
        delete "(b, X[i,...,k], $1 \leq k \leq n$)"
        and insert --(b, X [i,...,k], $1 \leq i \leq k \leq n$)--.

Signed and Sealed this

First Day of August, 2006

JON W. DUDAS
*Director of the United States Patent and Trademark Office*